United States Patent
Harris et al.

(10) Patent No.: US 9,506,243 B1
(45) Date of Patent: Nov. 29, 2016

(54) THERMALLY-RESPONSIVE FILM

(71) Applicant: E INK CORPORATION, Billerica, MA (US)

(72) Inventors: George G. Harris, Woburn, MA (US); Sunil Krishna Sainis, Melrose, MA (US)

(73) Assignee: E Ink Corporation, Billerica, MA (US)

( * ) Notice: Subject to any disclaimer, the term of this patent is extended or adjusted under 35 U.S.C. 154(b) by 0 days.

(21) Appl. No.: 14/664,471

(22) Filed: Mar. 20, 2015

Related U.S. Application Data

(60) Provisional application No. 61/955,964, filed on Mar. 20, 2014.

(51) Int. Cl.
E04B 1/76 (2006.01)
G02F 1/167 (2006.01)

(52) U.S. Cl.
CPC ............... E04B 1/76 (2013.01); G02F 1/167 (2013.01)

(58) Field of Classification Search
CPC ............................... E04B 1/76; G02F 1/167
USPC .............................................................. 52/1
See application file for complete search history.

(56) References Cited

U.S. PATENT DOCUMENTS

| 2,695,851 A | * | 11/1954 | Lodge ........................... 428/404 |
| 4,688,900 A | * | 8/1987 | Doane et al. ................... 349/87 |
| 4,772,506 A | * | 9/1988 | Siol et al. ...................... 428/212 |
| 4,877,675 A | * | 10/1989 | Falicoff et al. ............... 428/204 |
| 5,930,026 A | | 7/1999 | Jacobson et al. |
| 5,961,804 A | | 10/1999 | Jacobson et al. |
| 6,017,584 A | | 1/2000 | Albert et al. |
| 6,067,185 A | | 5/2000 | Albert et al. |
| 6,120,588 A | | 9/2000 | Jacobson |
| 6,120,839 A | | 9/2000 | Comiskey et al. |
| 6,130,774 A | | 10/2000 | Albert et al. |
| 6,172,798 B1 | | 1/2001 | Albert et al. |
| 6,241,921 B1 | | 6/2001 | Jacobson et al. |
| 6,249,271 B1 | | 6/2001 | Albert et al. |
| 6,262,706 B1 | | 7/2001 | Albert et al. |
| 6,262,833 B1 | | 7/2001 | Loxley et al. |
| 6,294,258 B1 | * | 9/2001 | Gentile ......................... 428/412 |

(Continued)

Primary Examiner — Brent W Herring
(74) Attorney, Agent, or Firm — Brian D. Bean

(57) ABSTRACT

The present invention relates to a thermally-responsive film that may, for example, be affixed to an exterior surface of a building to help control its temperature as it is exposed to the sun. The thermally-responsive film has a continuous phase and a discontinuous phase. The discontinuous phase comprises a plurality of droplets, each of which comprises the light-absorbing suspending fluid and the light-reflecting particles. The light-reflecting particles are dispersed in a vehicle that is either a second fluid that is immiscible with the suspending fluid and has a higher volumetric coefficient of thermal expansion than the suspending fluid, or a combination of materials that together have a higher volumetric coefficient of thermal expansion than the suspending fluid that together with the light-reflecting particles form composite particles. At temperatures lower than a threshold temperature, the vehicle containing the light-reflecting particles has a higher density than the suspending fluid and sinks towards the rear surface of the film, so that incident light is absorbed. At temperatures higher than the threshold temperature, the vehicle containing the light-reflecting particles has a lower density than the suspending fluid and moves towards the front surface of the film, enabling the light-reflecting particles to reflect incident light.

13 Claims, 5 Drawing Sheets

(56) References Cited

U.S. PATENT DOCUMENTS

| | | |
|---|---|---|
| 6,300,932 B1 | 10/2001 | Albert |
| 6,323,989 B1 | 11/2001 | Jacobson et al. |
| 6,327,072 B1 | 12/2001 | Comiskey et al. |
| 6,377,387 B1 | 4/2002 | Duthaler et al. |
| 6,382,125 B1 * | 5/2002 | Tamura .................. B41M 5/28 116/207 |
| 6,392,785 B1 | 5/2002 | Albert et al. |
| 6,392,786 B1 | 5/2002 | Albert |
| 6,459,418 B1 | 10/2002 | Comiskey et al. |
| 6,497,946 B1 * | 12/2002 | Kretman .................... C08J 5/18 359/515 |
| 6,515,649 B1 | 2/2003 | Albert et al. |
| 6,538,801 B2 | 3/2003 | Jacobson et al. |
| 6,580,545 B2 | 6/2003 | Morrison et al. |
| 6,652,075 B2 | 11/2003 | Jacobson |
| 6,672,921 B1 | 1/2004 | Liang et al. |
| 6,693,620 B1 | 2/2004 | Herb et al. |
| 6,721,083 B2 | 4/2004 | Jacobson et al. |
| 6,727,881 B1 | 4/2004 | Albert et al. |
| 6,788,449 B2 | 9/2004 | Liang et al. |
| 6,822,782 B2 | 11/2004 | Honeyman et al. |
| 6,839,158 B2 | 1/2005 | Albert et al. |
| 6,866,760 B2 | 3/2005 | Paolini, Jr. et al. |
| 6,870,661 B2 | 3/2005 | Pullen et al. |
| 6,922,276 B2 | 7/2005 | Zhang et al. |
| 6,950,220 B2 | 9/2005 | Abramson et al. |
| 6,958,848 B2 | 10/2005 | Cao et al. |
| 6,982,178 B2 | 1/2006 | LeCain et al. |
| 6,987,603 B2 | 1/2006 | Paolini, Jr. et al. |
| 7,002,728 B2 | 2/2006 | Pullen et al. |
| 7,038,655 B2 | 5/2006 | Herb et al. |
| 7,061,663 B2 | 6/2006 | Cao et al. |
| 7,071,913 B2 | 7/2006 | Albert et al. |
| 7,075,502 B1 | 7/2006 | Drzaic et al. |
| 7,079,305 B2 | 7/2006 | Paolini, Jr. et al. |
| 7,109,968 B2 | 9/2006 | Albert et al. |
| 7,110,164 B2 | 9/2006 | Paolini, Jr. et al. |
| 7,116,318 B2 | 10/2006 | Amundson et al. |
| 7,170,670 B2 | 1/2007 | Webber |
| 7,180,649 B2 | 2/2007 | Morrison et al. |
| 7,202,991 B2 | 4/2007 | Zhang et al. |
| 7,230,750 B2 | 6/2007 | Whitesides et al. |
| 7,230,751 B2 | 6/2007 | Whitesides et al. |
| 7,236,290 B1 | 6/2007 | Zhang et al. |
| 7,242,513 B2 | 7/2007 | Albert et al. |
| 7,247,379 B2 | 7/2007 | Pullen et al. |
| 7,304,634 B2 | 12/2007 | Albert et al. |
| 7,312,916 B2 | 12/2007 | Pullen et al. |
| 7,339,715 B2 | 3/2008 | Webber et al. |
| 7,375,875 B2 | 5/2008 | Whitesides et al. |
| 7,391,555 B2 | 6/2008 | Albert et al. |
| 7,411,719 B2 | 8/2008 | Paolini, Jr. et al. |
| 7,411,720 B2 | 8/2008 | Honeyman et al. |
| 7,420,549 B2 | 9/2008 | Jacobson et al. |
| 7,477,444 B2 | 1/2009 | Cao et al. |
| 7,532,388 B2 | 5/2009 | Whitesides et al. |
| 7,535,624 B2 | 5/2009 | Amundson et al. |
| 7,561,324 B2 | 7/2009 | Duthaler et al. |
| 7,679,814 B2 | 3/2010 | Paolini, Jr. et al. |
| 7,746,544 B2 | 6/2010 | Comiskey et al. |
| 7,839,564 B2 | 11/2010 | Whitesides et al. |
| 7,848,006 B2 | 12/2010 | Wilcox et al. |
| 7,848,007 B2 | 12/2010 | Paolini, Jr. et al. |
| 7,903,319 B2 | 3/2011 | Honeyman et al. |
| 7,910,175 B2 | 3/2011 | Webber et al. |
| 7,952,790 B2 | 5/2011 | Honeyman et al. |
| 8,018,640 B2 | 9/2011 | Whitesides et al. |
| 8,035,886 B2 | 10/2011 | Jacobson |
| 8,072,672 B2 * | 12/2011 | Powers et al. ................ 359/288 |
| 8,076,661 B2 * | 12/2011 | McCarthy et al. ........ 250/517.1 |
| 8,115,729 B2 | 2/2012 | Danner et al. |
| 8,129,655 B2 | 3/2012 | Jacobson et al. |
| 8,199,395 B2 | 6/2012 | Whitesides et al. |
| 8,270,064 B2 | 9/2012 | Feick et al. |
| 8,284,336 B2 * | 10/2012 | Powers et al. .................. 349/20 |
| 8,305,341 B2 | 11/2012 | Arango et al. |
| 8,319,759 B2 | 11/2012 | Jacobson et al. |
| 8,390,918 B2 | 3/2013 | Wilcox et al. |
| 8,446,664 B2 | 5/2013 | Chen et al. |
| 8,582,196 B2 | 11/2013 | Walls et al. |
| 8,593,718 B2 | 11/2013 | Comiskey et al. |
| 8,617,304 B2 * | 12/2013 | Wen et al. ................. 106/244 |
| 8,634,137 B2 * | 1/2014 | Powers et al. ........... 359/485.01 |
| 8,643,795 B2 * | 2/2014 | McCarthy et al. ............. 349/20 |
| 8,699,114 B2 * | 4/2014 | McCarthy et al. ........... 359/265 |
| 8,867,132 B2 * | 10/2014 | McCarthy et al. ...... 359/489.04 |
| 8,947,760 B2 * | 2/2015 | McCarthy .................... 359/288 |
| 2005/0012980 A1 | 1/2005 | Wilcox et al. |
| 2005/0156340 A1 | 7/2005 | Valianatos et al. |
| 2007/0091417 A1 | 4/2007 | Cao et al. |
| 2007/0178163 A1 * | 8/2007 | Kodas et al. .................. 424/489 |
| 2007/0290384 A1 * | 12/2007 | Kodas et al. .................... 264/5 |
| 2008/0038454 A1 * | 2/2008 | Keller et al. .................. 427/162 |
| 2008/0130092 A1 | 6/2008 | Whitesides et al. |
| 2009/0009852 A1 | 1/2009 | Honeyman et al. |
| 2009/0122389 A1 | 5/2009 | Whitesides et al. |
| 2009/0206499 A1 | 8/2009 | Whitesides et al. |
| 2009/0225398 A1 | 9/2009 | Duthaler et al. |
| 2010/0044894 A1 | 2/2010 | Valianatos et al. |
| 2010/0148385 A1 | 6/2010 | Balko et al. |
| 2010/0188726 A1 * | 7/2010 | Yoshimura et al. .......... 359/270 |
| 2011/0025934 A1 * | 2/2011 | McCarthy ............... G02F 1/132 349/20 |
| 2011/0111147 A1 * | 5/2011 | Agrawal et al. ................ 428/34 |
| 2011/0206836 A1 * | 8/2011 | Wen et al. .................... 427/162 |
| 2011/0217544 A1 * | 9/2011 | Young et al. ................. 428/327 |
| 2011/0256350 A1 * | 10/2011 | Ito ................. 428/156 |
| 2011/0286081 A1 | 11/2011 | Jacobson |
| 2012/0024344 A1 * | 2/2012 | Evanbar ....................... 136/246 |
| 2012/0109399 A1 * | 5/2012 | Tran ......................... H02J 3/14 700/296 |
| 2012/0293858 A1 | 11/2012 | Telfer et al. |
| 2013/0209814 A1 * | 8/2013 | Bharti ....................... B32B 7/12 428/463 |
| 2014/0017456 A1 * | 1/2014 | Xiao et al. .................. 428/195.1 |
| 2014/0349870 A1 * | 11/2014 | Aizenberg et al. ............... 506/9 |

* cited by examiner

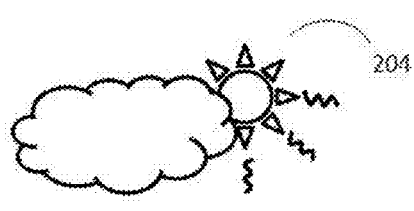
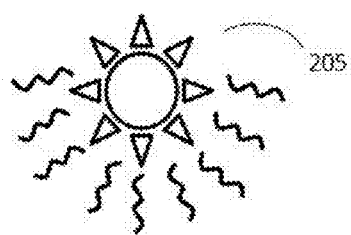
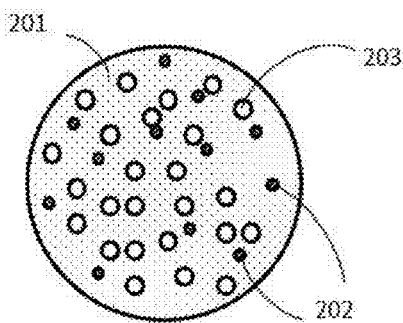
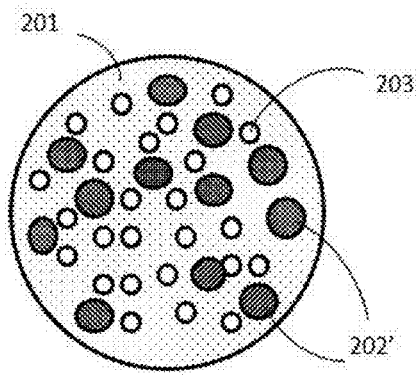
FIG. 2A
FIG. 2B

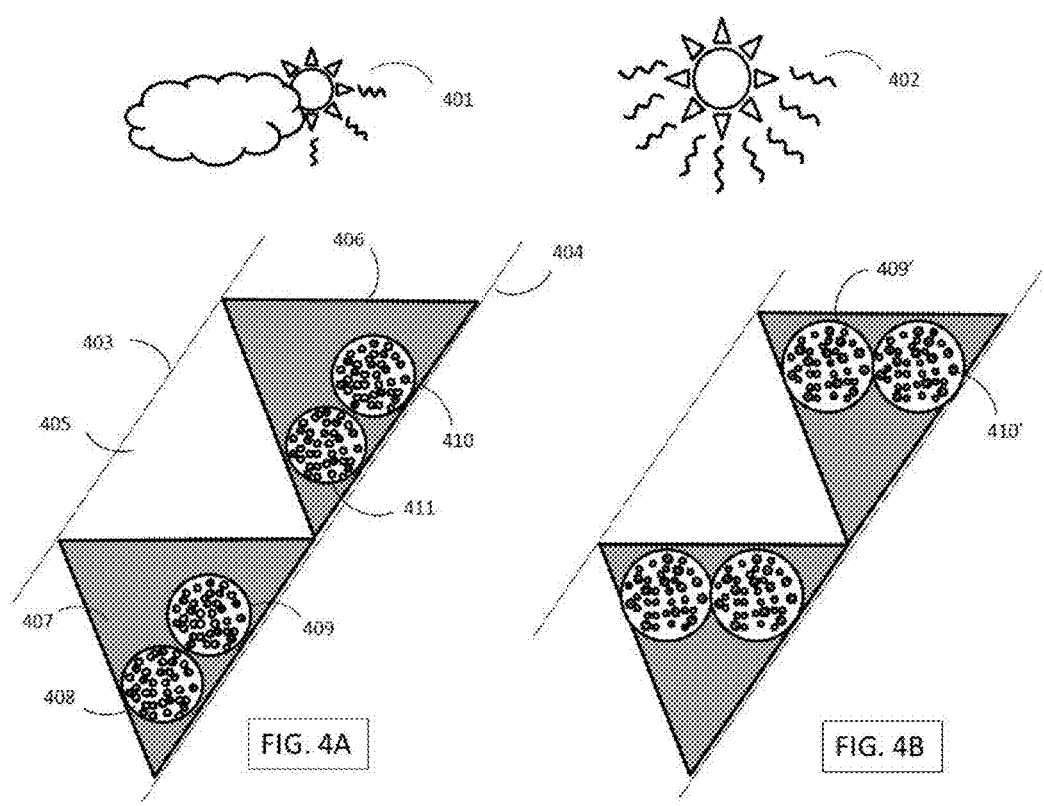

THERMALLY-RESPONSIVE FILM

REFERENCE TO RELATED APPLICATIONS

This application claims priority to U.S. Application No. 61/955,964, filed Mar. 20, 2014. The entire contents of all U.S. patents and published and copending applications mentioned below are herein incorporated by reference.

BACKGROUND OF INVENTION

The present invention relates to a thermally-responsive film that may, for example, be affixed to an exterior surface of a building to help control its temperature as it is exposed to the sun. The thermally-responsive film comprises a light-absorbing fluid containing light-reflecting particles that can move through the fluid. The thermally-responsive film is solar absorbing or solar reflecting depending on the whether the light-reflecting particles are moved towards the bottom surface or the top surface of the film. The present invention also provides for a thermally-responsive film having a continuous phase and a discontinuous phase. The discontinuous phase comprises a plurality of droplets, each of which comprises the light-absorbing suspending fluid and the light-reflecting particles. The light-reflecting particles are dispersed in a vehicle that is either a second fluid that is immiscible with the suspending fluid and has a higher volumetric coefficient of thermal expansion than the suspending fluid, or a combination of materials that together have a higher volumetric coefficient of thermal expansion than the suspending fluid and that, together with the light-reflecting particles, form composite particles. At temperatures lower than a defined threshold temperature, the vehicle containing the light-reflecting particles has a higher density than the suspending fluid and sinks towards the rear surface of the film, so that incident light is absorbed by the suspending fluid and not reflected by the light-reflective particles. At temperatures higher than the threshold temperature, the vehicle containing the light-reflecting particles has a lower density than the suspending fluid and moves towards the front surface of the film, enabling the light-reflecting particles to reflect incident light.

The skill and know-how of the present invention is closely related to similar technologies in the electro-optic field except that the present invention uses heat rather than an electric field to move particles. Numerous patents and applications assigned to or in the names of the Massachusetts Institute of Technology (MIT) and E Ink Corporation have been published describing encapsulated electrophoretic media. Such encapsulated media comprise numerous small capsules, each of which itself comprises a discontinuous phase containing mobile particles suspended in a liquid suspending medium, and a capsule wall surrounding the internal phase. Typically, the capsules are held within a polymeric binder or continuous phase. Additionally, these patents and applications describe forming multi-layered films and coatings containing encapsulated media. These references are relevant and apply to the present invention excluding those related to the electrical aspects of electro-optical displays.

Some electro-optic materials are solid in the sense that the materials have solid external surfaces, although the materials may, and often do, have internal liquid- or gas-filled spaces. Such displays using solid electro-optic materials may hereinafter for convenience be referred to as "solid electro-optic displays". Thus, the term "solid electro-optic displays" includes rotating bichromal member displays, encapsulated electrophoretic displays, microcell electrophoretic displays and encapsulated liquid crystal displays.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays. Nevertheless, problems with the long-term image quality of these displays have prevented their widespread usage. For example, particles that make up electrophoretic displays tend to settle, resulting in inadequate service-life for these displays.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 5,961,804; 6,017,584; 6,120,588; 6,120,839; 6,262,706; 6,262,833; 6,300,932; 6,323,989; 6,377,387; 6,515,649; 6,538,801; 6,580,545; 6,652,075; 6,693,620; 6,721,083; 6,727,881; 6,822,782; 6,870,661; 7,002,728; 7,038,655; 7,170,670; 7,180,649; 7,230,750; 7,230,751; 7,236,290; 7,247,379; 7,312,916; 7,375,875; 7,411,720; 7,532,388; 7,679,814; 7,746,544; 7,848,006; 7,903,319; 8,018,640; 8,115,729; 8,199,395; 8,270,064; and 8,305,341; and U.S. Patent Applications Publication Nos. 2005/0012980; 2008/0266245; 2009/0009852; 2009/0206499; 2009/0225398; 2010/0148385; 2010/0207073; and 2011/0012825;

(b) Capsules, binders and encapsulation processes; see for example U.S. Pat. Nos. 5,930,026; 6,067,185; 6,130,774; 6,172,798; 6,249,271; 6,327,072; 6,392,785; 6,392,786; 6,459,418; 6,839,158; 6,866,760; 6,922,276; 6,958,848; 6,987,603; 7,061,663; 7,071,913; 7,079,305; 7,109,968; 7,110,164; 7,202,991; 7,242,513; 7,304,634; 7,339,715; 7,391,555; 7,411,719; 7,477,444; 7,561,324; 7,848,007; 7,910,175; 7,952,790; 8,035,886; and 8,129,655; and U.S. Patent Application Publication Nos. 2005/0156340; 2007/0091417; 2008/0130092; 2009/0122389; 2010/0044894; 2011/0286080; and 2011/0286081;

(c) Films and sub-assemblies containing electro-optic materials; see for example U.S. Pat. Nos. 6,982,178 and 7,839,564;

(d) Backplanes, adhesive layers and other auxiliary layers and methods used in displays; see for example U.S. Pat. Nos. 7,116,318 and 7,535,624;

(e) Color formation and color adjustment; see for example U.S. Pat. No. 7,075,502, and U.S. Patent Application Publication No. 2007/0109219;

(f) Non-electrophoretic displays, as described in U.S. Pat. Nos. 6,241,921; 6,950,220; 7,420,549 and 8,319,759; and U.S. Patent Application Publication No. 2012/0293858.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760. Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to E Ink California, LLC. Hereinafter, the term "microcavity" may be used to cover both encapsulated and microcell structures.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed (using a variety of methods), the display itself can be made inexpensively.

In many climates, the temperature fluctuates seasonally, or even daily, above and below ideal living conditions (approximately 70° F.). It is common for homes and offices to have heating and cooling systems to maintain a comfortable temperature. However, these systems may require a significant amount of energy and may produce a large amount of pollution. In an effort to reduce energy costs and environmental impact, buildings are becoming more energy efficient. One way to achieve this is to allow absorption of incident sunlight to heat a roof or to reflect incident sunlight so that the roof is less significantly heated. Depending on the climate, a building may be optimized for either solar absorption or solar reflection—more absorption in cooler climates and more reflection in warmer climates. In cooler climates, solar absorption reduces the load on the heating system during winter months, but increases the load on the cooling system in the summer months. Therefore, it is desirable that an energy efficient material be capable of exhibiting both solar absorbing and solar reflecting properties, and be capable of switching between these two states as a function of temperature.

SUMMARY OF INVENTION

Accordingly, the present invention relates to a thermally-responsive film that may be solar absorbing or solar reflective. The present invention provides for a thermally-responsive film having a continuous phase and a discontinuous phase. The discontinuous phase comprises a plurality of droplets, each of which comprises a light-absorbing suspending fluid and light-reflecting particles. The light-reflecting particles may be dispersed in a second fluid that is immiscible with the suspending fluid and has a higher volumetric coefficient of thermal expansion than the suspending fluid, or may be incorporated into composite particles comprising a material or materials that change density with temperature. The continuous phase surrounds and encapsulates the discontinuous phase.

The discontinuous phase functions as the thermally-responsive material. Absorption of light by the light-absorbing suspending fluid causes heating of the entire discontinuous phase (and the other components in the film). As the fluid temperature increases, the density of the material containing the light-scattering particles (either a second solvent or other materials that, taken together with the light-scattering particles, comprise a composite particle) decreases more than the density of the suspending fluid and the light-scattering particles rise towards the top surface of the film. In this position, the light-scattering particles reflect sunlight and reduce further heating of the fluid. In this aspect, the film acts as a solar reflector and reduces heating of the surface. If the surface is cooled, the density of the material containing the light-scattering particles increases more than the density of the suspending fluid and the light-scattering particles drop towards the rear surface of the film. In this position, the light-scattering particles are hidden behind the light-absorbing material in the suspending fluid. In this aspect, the film acts as a solar absorber and transfers heat to the surface.

In another aspect, the present invention may be a film having first and second substrates and a layer of thermally-responsive material disposed between these substrates. The first and second substrates may provide mechanical support and protect the thermally responsive layer from damage. Additionally, the first substrate (or top substrate layer, i.e., exposed to the sun) may be UV reflective or absorbing to protect the thermally-responsive layer from degradation. Alternatively, the present invention may have only one substrate that provides mechanical support and/or protection. The one substrate may be the front substrate where the back side of the film is attached to a stable surface, such as a roof or side of a building. On the other hand, the one substrate may be the back substrate where the continuous phase provides sufficient stability and protection to the discontinuous phase.

In another aspect, this invention provides for a thermally-responsive film comprising a continuous and a discontinuous phase wherein the continuous and discontinuous phases are dispersed on a surface in aqueous form and solidify to create a film. The continuous and discontinuous phases may be mixed in a solution prior to application or may be mixed together during the application process.

In another aspect, this invention also provides for a composite particle having a reflective component and a density-changing component, wherein the density-changing component changes volume in response to a change in temperature. The reflective component may be a white pigment or a metal. The density-changing component may be a gas or a liquid. The gas or liquid may be contained within a polymer matrix. Alternatively, the composite particle may be a density-changing material, such as a wax, that changes in density in response to a change in temperature. Light reflective particles may be dispersed throughout the density-changing material.

BRIEF DESCRIPTION OF DRAWINGS

FIGS. 2A and 2B are illustrative schematics of a composite particle of the present invention.

FIGS. 4A and 4B are illustrative schematics showing two droplets of an alternate embodiment of the present invention.

DETAILED DESCRIPTION

As indicated above, the present invention provides for a thermally-responsive film that may be solar absorbing or solar reflective. In another aspect, the present invention provides for a thermally-responsive film having a continuous phase and a discontinuous phase. The discontinuous phase comprises a plurality of droplets, each of which comprises a light-absorbing suspending fluid and light-reflecting particles. The light-reflecting particles may (A) be dispersed in a second fluid that is immiscible with the suspending fluid and has a higher volumetric coefficient of thermal expansion than the suspending fluid, or (B) may be incorporated into composite particles comprising a material or materials that change density with temperature. The continuous phase surrounds and encapsulates the discontinuous phase.

In the present invention, the discontinuous phase functions as the thermally-responsive material. Absorption of light by the light-absorbing suspending fluid causes heating of the entire discontinuous phase (and the other components in the film). As the fluid temperature increases, the density of the material containing the light-scattering particles (either (A) a second solvent or (B) other materials that, taken together with the light-scattering particles, comprise a composite particle) decreases more than the density of the suspending fluid and the light-scattering particles rise towards the top surface of the film. In this position, the light-scattering particles reflect sunlight and reduce further heating of the fluid. If the surface is cooled, the density of the material containing the light-scattering particles increases more than the density of the suspending fluid and the light-scattering particles drop towards the rear surface of the film. In this position, the light-scattering particles are hidden behind the light-absorbing material in the suspending fluid. In this aspect, the film acts as a solar absorber and transfers heat to the surface. In another aspect, the film acts as both a solar absorber and a solar reflector by continuously cycling between heating and cooling. This constant cycling prevents excessive heating and cooling of the surface and helps maintain a normalized temperature range.

Figure 1A:
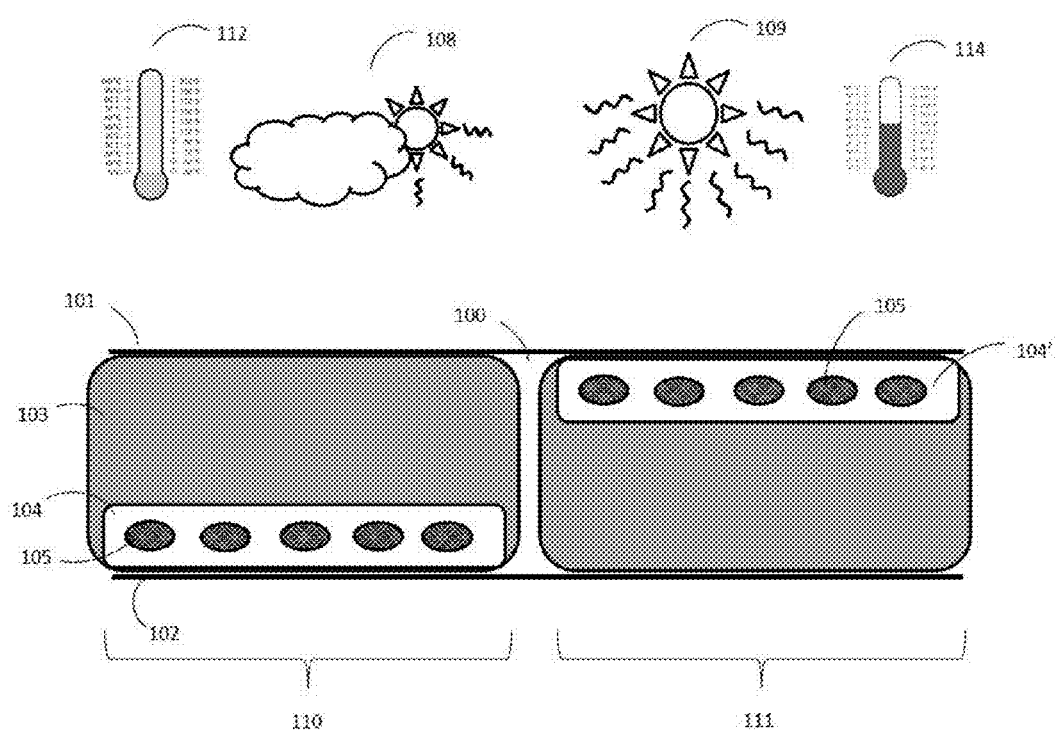
FIGS. 1A and 1B are illustrative schematics showing two droplets of a thermally-responsive film of two embodiments of the present invention.

FIG. 1A is an illustrative schematic showing two droplets of a thermally-responsive film of the present invention in which light-reflective particles are dispersed in a second solvent, immiscible with the suspending fluid. The first droplet (110) is under cool conditions (indicated by thermometer 112 and cloud covered sun 108) and the second droplet (111) is under hot conditions (indicated by thermometer 114 and full sun 109). The continuous phase (100) surrounds the discontinuous phase (110, 111), which in this embodiment is shown as an array of rectangular microcells. The continuous and discontinuous phases are sandwiched between a first substrate (101) and a second substrate (102). The suspending fluid (103) contains an immiscible second liquid (104) that itself contains the light-reflective particles (105) and is disposed within the microcells. Hereinafter the compartmentalized (spatially segregated) suspending fluid and its contents may be referred to as "droplets" of the suspending fluid and associated components. Under cool conditions (108), the combination of the immiscible second liquid (104) and the light-reflective particles (105) is denser than the suspending fluid and the light-reflective particles (dispersed in the second fluid) fall to the bottom of the droplet. Under hot conditions (109), the solar absorbing suspending fluid heats up and all the materials expand. The immiscible second liquid (104), however, expands more than the suspending fluid (103), such that the density of the combination of the heated immiscible second fluid (104') and the light-reflecting particles (105) becomes lower than that of the suspending fluid (103). The light-reflective particles (dispersed in the second fluid) rise to the top of the droplet.

It will be clear to one of skill in the art that as the temperature of the film and its contents changes, the volumes of all its components (particles, fluids, and polymeric binders) will change. Typically, the coefficients of volumetric expansion at atmospheric pressure of gases will be greater than those of liquids, which will in turn be greater than those of solids. In the discussion given above, the behavior was described as being governed principally by the thermal expansion differences between two liquids (the suspending fluid and the second fluid). Such differences can be substantial: for example, the volumetric coefficient of thermal expansion of gasoline at 20° C. is about $9.5 \times 10^{-4}$ $K^{-1}$, whereas that of water at this temperature is about $2.1 \times 10^{-4}$ $K^{-1}$. Volumetric coefficients of thermal expansion of the plastic materials used as binders (i.e., for example, the continuous phase described above) are typically lower than this. Poly(vinyl chloride), for example, has a volumetric coefficient of thermal expansion at 20° C. of $1.6 \times 10^{-4}$ $K^{-1}$.

Figure 1B:
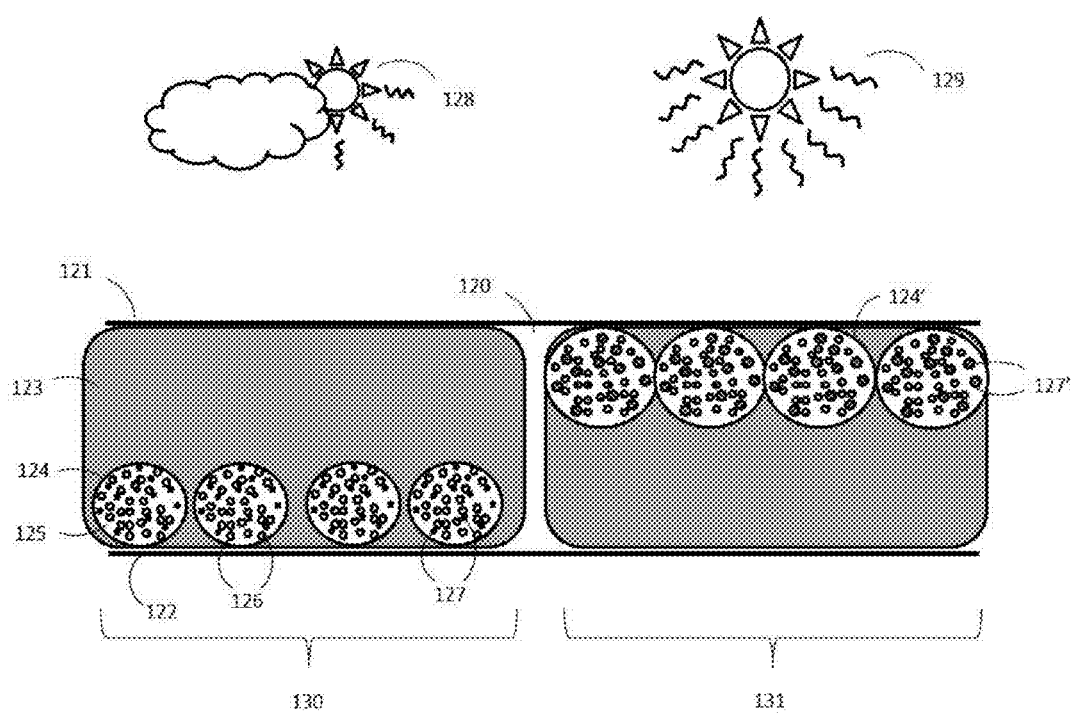

Alternatively, it is possible in the present invention to use a gas as a component in a composite particle that contains the light-reflecting particles. FIG. 1B is an illustrative schematic showing two droplets of a thermally-responsive film of this embodiment of the present invention. The first droplet (130) is under cool conditions (indicated by a clouded sun 128) and the second droplet (131) is under hot conditions (indicated by sun 129). The continuous phase (120) surrounds the discontinuous phase (130, 131), which in this embodiment is displayed as an array of rectangular microcells. The continuous and discontinuous phases are sandwiched between a first substrate (121) and a second substrate (122). The suspending fluid (123) is disposed within the microcells (to form droplets). Composite particles (124) are disposed within the suspending fluid (123). The composite particles (124) consist of a polymer matrix (125), reflective components (126) and gas bubbles (127), which are the density-changing components. Under cool conditions (128), the composite particles (124) are denser than the suspending fluid and fall to the bottom of the droplet. Under hot conditions (129), the solar absorbing suspending fluid heats up and causes the gas bubbles to expand (127'). The expanding gas bubbles decrease the density of the composite particles, which causes the particles to rise (124').

The polymer matrix must be sufficiently pliable that the volume changes resulting from differential thermal expansion result in a translation of the light-reflecting particles. This is particularly important when a gaseous component is used: if the polymer matrix is too rigid, the gas pressure may increase but its volume may change insufficiently for the desired density differential between the components containing the light-reflecting particles and the suspending fluid to be achieved. In addition, the polymer matrix should be able to contain the density variable gas or liquid within the space and should minimize the amount of gas or liquid that leaks out or diffuses into the polymer.

FIGS. 1A and 1B are schematic representations of a film of the present invention and are not to scale. The thickness of the continuous layer of the present invention may range from 0.025 mm to 50 mm. The diameter/size of the droplets may range from 0.15 mm to 10 mm. Preferably, the overall thickness of the film, which includes the continuous phase and any substrates, is approximately 1 mm.

The continuous phase may act as a mechanical support for the discontinuous phase. Preferably, the continuous phase is light-transmissive over the solar spectrum. The continuous phase material may be light blocking (reflective or absorptive) for any solar wavelengths that may degrade the material, for example, through the addition of UV stabilizers.

As described above, the droplets in the discontinuous phase contain a light-absorbing suspending fluid and either an immiscible second solvent or at least one composite particle that reflects light and whose density changes more than that of the suspending fluid in response to a change in temperature. The droplets or cavities may be any of the types described in the aforementioned patents and applications, including microcapsules, microcells and droplets. The droplet may be highly conformable or rigid. Preferably, droplets are in a single layer. Droplets may overlap and be non-uniform in shape.

In the present invention, the discontinuous phase (droplets) may comprise from about 40 percent to about 95 percent by volume of the medium, but preferably comprises about 50 percent to about 80 percent by volume. The optimum proportion of droplets will vary with the specific materials employed, but will typically range from about 60 percent to about 70 percent by volume. If the proportion of droplets to is too high, the film may be mechanical weak and easily damaged, and droplets may leak from rough handling or exposure. Likewise, it is undesirable to use a substantially larger proportion of continuous phase than is necessary to provide mechanical strength as the discontinuous phase provides the thermally-responsive properties.

The suspending fluid in the droplets may be any suitable light-absorbing fluid. A preferred solar-absorbing suspending fluid has a low viscosity (less than about 100 centistokes), a low toxicity, a low environmental impact, a high boiling point (greater than 90° C.), a low thermal expansion coefficient and a good light stability.

The fluid may be colored with a light-absorbing material, such as a black dye or a dark pigment. In some preferred embodiments, the suspending fluid is broadly absorbing over the entire solar spectrum, including in the IR and UV regions. Preferably, the solar-absorbing material is carbon black or a black or pan-absorbing metal oxide (or mixed metal oxide) dispersed in the fluid.

There is, however, much flexibility in the choice of light-absorbing material. The light-absorbing material may be selectively absorbing (or example, a colored pigment may be used in any preferred color). If the light-absorbing material is a pigment, as is known in the art, pigment particles are more easily dispersed when the particle size is approximately 5 μm or smaller. If the light-absorbing material is a dye, the dye may be a pure compound, or blends of dyes to achieve a particular color, including black. There are many dyes that may be used in the present invention. Properties important here include light fastness, solubility in the suspending liquid, color, and cost. These dyes may be chosen from the classes of azo, anthraquinone, and triphenylmethane type dyes and may be chemically modified so as to increase their solubility in the oil phase and reduce their adsorption by the particle surface.

A number of dyes already known to those skilled in the art may prove useful. Useful azo dyes include, but are not limited to, the Oil Red dyes, and the Sudan Red and Sudan Black series of dyes. Useful anthraquinone dyes include, but are not limited to, the Oil Blue dyes, and the Macrolex Blue series of dyes. Useful triphenylmethane dyes include, but are not limited to, Michler's hydrol, Malachite Green, Crystal Violet, and Auramine O.

A wide variety of solvents may be used in the suspending fluid in the discontinuous phase. The choice of solvent in the suspending fluid depends upon which embodiment of the invention is used. When the embodiment of FIG. 1A is used, the suspending fluid must be immiscible with the second fluid and have a lower coefficient of thermal expansion. As noted above, water has a much lower coefficient of thermal expansion than hydrocarbon solvents, and is thus a good choice for the suspending fluid. Another possible choice is a fluorocarbon solvent.

When the composite-particle embodiment of FIG. 1B is used, a much wider variety of solvents is available. Water-immiscible solvents are preferred when an aqueous-solution method of encapsulation is to be employed, as described below.

The suspending fluid for use in conjunction with composite particles should be a poor solvent for the polymers that comprise the matrix of the composite particles. Organic solvents, such as halogenated organic solvents, saturated linear or branched hydrocarbons, silicone oils, and low molecular weight halogen-containing polymers are some useful suspending fluids. The suspending fluid may comprise a single solvent. The suspending fluid will, however, often be a blend of more than one solvent in order to tune its chemical and physical properties. Furthermore, the fluid may contain surface modifiers to modify the surface energy or charge of the suspended particle or bounding capsule. Reactants or solvents for the encapsulation process (oil soluble monomers, for example) may be contained in the suspending fluid. The suspending fluid may contain additives to lower its freezing point so that the fluid remains a liquid over the operating temperature range. Some examples of additives include soluble salts and ethylene glycol.

Preferred organic solvents of low density include hydrocarbons such as dodecane, tetradecane, the aliphatic hydrocarbons in the Isopar™ series (Exxon, Houston, Tex.), Norpar® (a series of normal paraffinic liquids), Shell-Sol® (Shell, Houston, Tex.), and Sol-Trol® (Shell), naphtha, and other petroleum solvents, silicone oils including, but not limited to, octamethyl cyclosiloxane and higher molecular weight cyclic siloxanes, poly(methyl phenyl siloxane), hexamethyldisiloxane, and polydimethylsiloxane ("PDMS"), aromatic hydrocarbons such as toluene and xylene, vinyl ethers, such as cyclohexyl vinyl ether and Decave® (International Flavors & Fragrances, Inc., New York, N.Y.) and esters such as ethyl acetate. Preferred organic solvents of high density include halogenated organic solvents including, but not limited to, tetrafluorodibromoethylene, tetrachloroethylene, trifluorochloroethylene, 1,2,4-trichlorobenzene and carbon tetrachloride. Useful low molecular weight halogen-containing polymers include, but are not limited to, poly(chlorotrifluoroethylene) polymer (Halogenated Hydrocarbon Inc., River Edge, N.J.), Galden® (a perfluorinated ether from Ausimont, Morristown, N.J.), or Krytox® from du Pont (Wilmington, Del.). In one preferred embodiment, the suspending fluid is a poly(chlorotrifluoroethylene) polymer. In a particularly preferred embodiment, this polymer has a degree of polymerization from about 2 to about 10. Many of the above materials are available in a range of viscosities, densities, and boiling points, and use of mixtures of these components may afford precise control over the density of the suspending fluid.

In certain embodiments, the suspending fluid must be capable of being formed into small droplets prior to combination with the continuous phase. Processes for forming small droplets include flow-through jets, membranes, nozzles, or orifices, as well as shear-based emulsifying schemes. The formation of small drops may be assisted by electrical or sonic fields. As previously mentioned, surfactants, and possibly polymers, may be used to aid in the stabilization and emulsification of the droplets.

In both embodiments of the present invention, the light-reflective particle may be selected from organic or inorganic compounds. The term "light-reflective" refers to scattering (i.e., diffusely reflecting), refracting, or specularly reflecting: any physical mechanism that results in incident light being reflected from, and not absorbed by the film of the present invention.

As noted above, in one preferred embodiment, the reflective pigment exhibits broad solar reflectivity, including in the IR and UV regions of the electromagnetic spectrum. However, in other embodiments, the light-reflecting particle is not reflective over the entire spectrum. It may be preferred to use a pigment that reflects infra-red radiation but absorbs visible light. If such a pigment is used, the appearance of a building may not change appreciably when the thermally-responsive film of the invention affixed thereto changes from the light-reflecting to the light-absorbing mode.

Typical considerations for the reflective component are its optical properties (light scattering), thermal stability and surface chemistry. The reflective component may comprise unmodified pigments, dyed (laked) pigments or pigment/polymer composites that are light-scattering. The reflective component may be charged, uncharged or capable of acquiring a charge. The reflective material may be a white pigment particle, such as titanium dioxide or calcium carbonate. Preferably, the reflective material is titanium dioxide. Alternatively, the reflective component may be a specular reflector such as a metal coating on the surface of the particle.

In the embodiment of the present invention comprising immiscible liquids, illustrated in FIG. 1A, the light-reflecting particle may be surface-treated to ensure that it partitions into the second fluid and not into the suspending fluid. For example, when the suspending fluid is water and the second fluid is an oil, the light-reflecting particles should bear a hydrophobic surface treatment. Many methods for providing such treatments are known in the art.

In the embodiment of the present invention comprising composite particles, described with reference to FIG. 1B, the composite particles comprise a reflective component and a density-altering component. In one alternative, the composite particle may comprise a reflective component, such as titania, embedded in a polymer that changes density in response to temperature. In another alternative, the composite particle may comprise a reflective component, such as titania, embedded in a polymer that additionally comprises density-alternating components, such as gas bubbles, that change the density of the composite particle in response to a change in temperature. In another alternative, the composite particle may comprise a reflective component, such as titania, dispersed in a density-altering fluid, such as Isopar™. In another alternative, the composite particle may be an encapsulated particle containing a reflective component, such as titania, dispersed in a density-altering fluid.

Composite particles may be charged or uncharged depending on the composition of the film. For example, if the walls of the continuous phase encompassing the droplets are charged, the composite particles may carry a similar charge to prevent them from sticking to the walls. Composite particles may be any appropriate shape, such as spherical, oval, fusiform or plate-shaped, and may be highly conformable. Composite particle size may range from 1 micron to about 80% of the droplet size as long as there is sufficient space for the light-absorbing fluid to cover the composite particle(s). Composite particle size may vary depending on the film specifications. Each droplet may have one large composite particle or a plurality of smaller composite particles. For example, in an embodiment where a droplet consists of a white composite particle and a black suspending fluid, the white composite particle may fill the bulk of the droplet as long as the suspending fluid absorbs a majority of the impinging solar radiation. The composite particle should be highly conformable when it fills the bulk of the droplet.

The density altering component of a composite particle may be a gas or liquid embedded in a polymer matrix. The gas or liquid may comprise multiple small bubbles embedded within the particle or may comprise one large bubble encapsulated in the particle. A liquid with a boiling point at the threshold temperature of the film may be used. The density altering gas or liquid should be relatively inert and non-flammable, such as carbon dioxide, helium, argon, nitrogen or other noble gases.

Useful polymers for the composite particles include, but are not limited to: polyethylene, polypropylene, phenolic resins, du Pont Elvax resins (ethylene-vinyl acetate copolymers), polyesters, polyacrylates, polymethacrylates, PDMS, ethylene acrylic acid or methacrylic acid copolymers (Nucrel Resins—du Pont, Primacor Resins—Dow Chemical), acrylic copolymers and terpolymers (Elvacite Resins—du Pont), polystyrene and PMMA.

The specific polymers, materials and fluids used for the composite particles will vary with the pigment densities. For example, titanium dioxide has a density of 4.23 g/cm$^3$ whereas calcium carbonate has a much lower density of approximately 2.8 g/cm3, depending on the polymorph.

For a two fluid system having a discontinuous phase droplets with a maximum diameter between 0.01 mm and 1 mm, the continuous phase may have a Young's modulus of 0.01-1 GPa (which is a range that is commonly found in rubbers and plastics). For a composite particle containing foam material, with a pore diameter of 0.1 µm to 10 µm, as the density changing material, the composite particle wall material may have a Young's modulus of 0.01-1 GPA and a wall thickness of 0.1 µm to 1 µm.

FIGS. 2A and 2B are illustrative schematics of composite particles of the present invention. FIG. 2A shows a composite particle having reflective components (203) and density changing components (as depicted, compartments containing a gas) (202) embedded in a polymer (201). Under cool conditions (as indicated by the clouded sun 204), the density dependent components contract and maintain the composite particle at a heavier density.

FIG. 2B shows a composite particle under heated conditions (as indicated by the sun 205) where the density-altering component expands (202') and reduces the density of the composite particle. In this illustration, the polymer is elastic so that the gas or liquid bubbles expand and increase in size (202'). Under heated conditions, the composite particle may increase in size as well.

At a low temperature, the composite particles may be denser than the suspending fluid, so that the particles sink to the bottom of the droplet leaving the suspending fluid to be heated by the sunlight. As the suspending fluid is heated, the density-altering component in the composite particle will cause a decrease in density and the composite particle will rise above the suspending fluid.

Figure 3A:
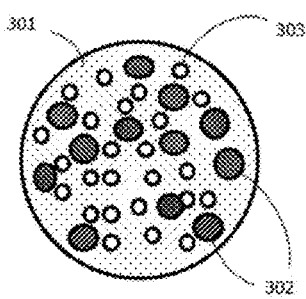
FIGS. 3A-3F are illustrative schematics of alternative composite particles of the present invention.
Figure 3B:
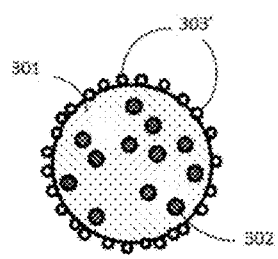
Figure 3C:
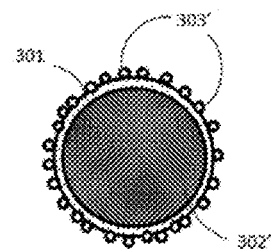
Figure 3D:
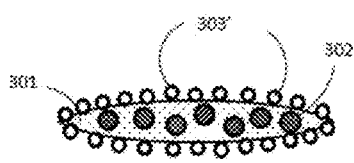
Figure 3E:
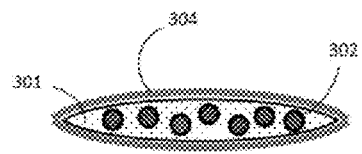
Figure 3F:
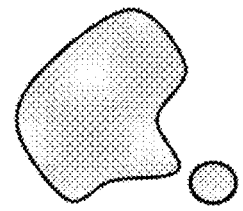

FIGS. 3A-3F are illustrations of alternative composite particles of the present invention. FIG. 3A shows a spherical composite particle having reflective components (303) and density altering components (302) embedded in a polymer (301). FIG. 3B shows a spherical composite particle having a plurality of gas bubbles (302) embedded in a polymer (301) and reflective pigments (303') attached to the surface of the composite particle. FIG. 3C shows a spherical composite particle with a single gas bubble embedded in a polymer and a plurality of reflective pigments (303') attached to the surface of the composite particle. FIG. 3D shows a fusiform-shaped composite particle similar to FIG. 3B having a plurality of gas bubbles (302) embedded in a polymer (301) and a plurality of reflective pigments (303') attached to the surface of the composite particle. FIG. 3E shows a fusiform-shaped composite particle having a plurality of gas bubbles (302) embedded in a polymer (301) and a metallic reflective material (304) attached to the surface of the composite particle. FIG. 3F shows a composite particle having light-reflecting particles dispersed in a density-altering fluid.

The choice of continuous phase depends upon whether the immiscible liquid embodiment of the present invention (shown in FIG. 1A) or the composite particle embodiment (shown in FIG. 1B) is used. In the former case, the method of formation of the continuous phase must be compatible with the two immiscible liquids, which are typically oil and water. It is preferred that such mixtures be compartmentalized by being introduced (by ink jet or coating methods) into microcell structures that are then sealed by lamination of a top substrate.

When the composite particles are used, a wider choice is available for the continuous phase, since there will now be only a single solvent. If this solvent is an oil, aqueous solution methods may be used to form the continuous phase, as described below.

As described in U.S. Pat. No. 6,866,760, filed on Mar. 15, 2005, the continuous phase may be prepared in various ways when only a single solvent is used (i.e., in the embodiments of the present invention that utilize composite light-reflective particles). In one aspect, the embodiment of FIG. 2 of the present invention may be prepared by dispersing the droplets in a liquid medium containing a film-forming material, and then subjecting the liquid medium to conditions effective to cause the film-forming material to form a film and thus produce the medium in which the film-forming material forms the continuous phase and the droplets form the discontinuous phase. The initial dispersion or emulsification of the droplets in the liquid medium may be effected by any of a variety of conventional techniques, for example rapid stirring of a mixture of the liquid medium and the material which will form the droplets, or sonication of such a mixture. Devices suitable for forming the droplets also include, but are not limited to, blade mixers, rotor-stator mixers and colloid mills, devices in which a liquid stream is pumped at high pressures through an orifice or interation chamber (such as the Microfluidizer sold by Microfluidics), sonicators, Gaulin mills, homogenizers, blenders, etc. The dispersion or emulsification may also be effected by shearing, using a colloid mill or similar apparatus. The presence of the solid composite particles within the droplets tends to make a dispersion or emulsion of such droplets less stable than a similar emulsion or dispersion of the same materials in which the droplets do not contains solid particles. Hence, it is preferred to use a liquid medium which can solidify rapidly, such as a gelatin solution.

Good results have been achieved by using a gelatin solution as the liquid medium and spreading a thin layer of at least about 50 μm, but preferably from about 100 μm to about 500 μm, on to a cool substrate so that the gelatin solidifies very rapidly. Typically the layer is spread to a thickness of about 250 μm. As already indicated, the film-forming material used in the present invention is preferably gelatin, such as lime-processed gelatin, acid-processed pig gelatin or acid-processed ossein gelatin, or a modified gelatin such as acetylated gelatin, phthalated gelatin, oxidized gelatin, etc. Other film formers include water-soluble polymers and co-polymers including, but not limited to, poly (vinyl alcohol), partially hydrolyzed poly(vinyl acetate/vinyl alcohol), hydroxyethyl cellulose, poly (vinylpyrrolidone), and polyacrylamide. Copolymers of these with hydrophobic monomers, such as t-butyl acrylamide, or isopropyl acrylamide can also be used. Polymeric film formers that are also capable of gelation upon application of high or low temperature are particularly useful. Such materials include the various gelatins described above, cellulosic materials, and homopolymers or copolymers containing isopropyl acrylamide.

Radiation-curable (typically ultra-violet light-curable) materials may also be used as film formers, which could be an aqueous dispersion of a curable polymer, a polymer melt, a monomer, an oligomer or various mixtures of these forms. The curable material could be a separate continuous phase analogous to the gelatin continuous phase already described. However, the curable material could also be dissolved in the "discontinuous" phase so that upon exposure to the curing radiation, the curable material both cures and separates from the phase in which it is originally dissolved to form a separate continuous phase. Such a system would have the advantage that, prior to the radiation exposure, the liquid medium would constitute only a single phase (except of course for the composite particles dispersed therein) and coating such a single phase system is often simpler and easier to control than coating of a multi-phase system.

Alternatively, the film-forming material may be a two-component system. For example, one component could be a polymerizable material and the other a polymerization initiator (the use of liquid media containing glycol-type solvents might be useful in such systems). In another example, the two components could be reagents known to be stable in isolation but to form a polymer on contact with one another, for example a polyurethane pre-polymer and water or another active-hydrogen containing material. A two-component film-forming material may be useful, for instance, where it is desired to spray the liquid medium on to a substrate, rather than coat the substrate. As is well-known in the coating industry, a mixture containing a two-component film-forming material can conveniently be sprayed by pumping a liquid medium containing one component through a nozzle provided with an injection port through which the other component is added to the liquid medium, so that the two-component mixture is formed within the nozzle and immediately sprayed.

Some two-component film-forming materials are available which have a substantial "lag" time between the time when the components are mixed and the polymerization or other film-forming process occurs, or which require some external stimulus, such as heat or contact with atmospheric moisture, to initiate the film-forming process. Any of these systems permit mixing of all the components before the liquid medium is deposited upon the substrate.

A two-component film-forming material may also be useful for coating irregularly-shaped substrates and/or coating only certain parts of substrates. In both cases, the first of the two components may be placed on the substrate, or on those parts of the substrate which it is desired to coat with the final thermally-responsive medium (for example, an irregularly-shaped substrate could be coated by dip coating), and then the liquid phase containing the second component of the film-forming material could be applied to the substrate so that the thermally-responsive medium is formed only on those parts of the substrate previously coated with the first component.

In a further variant of a two-component film-forming material, one of the two components is dispersed in the continuous phase of the liquid medium, while the second component is dispersed in the droplets, so that film formation occurs first at the phase boundary between the droplets and the continuous phase, thus producing weak walls around the droplets and thus reducing any tendency for the droplets to rupture or otherwise become damaged during later handling or shrinkage of the film.

A wide variety of materials may be used in all embodiments of the present invention. The continuous phase may be prepared from aqueous materials such as dispersion polymers, which include latexes, urethane dispersions, silicones and epoxies, and solution polymers such as poly(vinyl alcohol) and polyvinylpyrrolidone. Other continuous phase forming materials may include lower consolute temperature polymers such as N-isopropylacrylamide, and highly shear thinning, high low-shear viscosity polymers such as gums, xanthan, carageenan, associative thickeners, and cellulosic gelling agents. Silicone polymers may be used in the continuous phase where stability of the medium is of major concern. Also, the continuous phase may comprise a pressure-sensitive adhesive to improve adhesion of the film to a substrate or other surface.

The present invention may be varied by first forming a layer comprising the continuous phase and then injected droplets of the discontinuous phase into this layer, for example by ink jet printing or similar techniques. Where the continuous phase is of a type which is to be shrunk to produce the film, it is generally desirable to inject the droplets of the discontinuous phase before shrinking to provide non-spherical droplets in the final thermally-responsive film.

FIGS. 4A and 4B are illustrative schematics showing two droplets of an alternate embodiment of the present invention for attachment to a non-level surface, such as a slanted roof. FIGS. 4A and 4B show a thermally-responsive film of the present invention having a discontinuous phase containing microcells (droplets) in the shape of triangular prisms or troughs (406) and a continuous phase (405) surrounding the microcells. The two phases (405, 406) are disposed between a first substrate (403) and a second substrate (404). FIG. 4A illustrates the thermally-responsive film under cool conditions (401). The suspending fluid (407) is disposed within the microcells. The composite particles (409) are disposed within the suspending fluid (407) and are capable of moving through the fluid. The composite particles (409) consist of a polymer matrix (408), reflective components (411) and density responsive components (410), in this illustration, gas bubbles. Under cool conditions (401), the composite particles (409) are denser than the suspending fluid and fall to the bottom of the microcell. The suspending fluid on the front surface of the microcell absorbs light to heat the surface. If the fluid temperature is hot enough, it alters the density of the composite particles.

FIG. 4B illustrates the thermally-responsive film under hot conditions (402), where the solar absorbing suspending fluid heats up and causes the gas bubbles to expand (410'). The expanding gas bubbles decrease the density of the composite particles, which causes the particles to rise (409'). The composite particles on the front surface of the microcell reflect light to cool the surface.

A thermally-responsive film of the present invention with a discontinuous phase comprising two fluids as described with reference to FIG. 1A, namely a light-absorbing suspending fluid and a second, immiscible fluid that contains the light-reflecting particles, may be fabricated using the following criteria. In this example, the light-absorbing suspending fluid will be referred to as "the black fluid" and the immiscible fluid containing the light-reflecting particles will be referred to as "the white fluid".

First, two fluids are selected that have different thermal expansion coefficients so that the densities of the fluids change at different rates in response to temperature changes. For example, as describes above, the white fluid may have a density that changes more significantly than the black fluid (i.e., the white fluid has a higher thermal expansion coefficient). The density variance of the white fluid will be greater than that of the black fluid over the same temperature range. In this example, Isopar™ E is selected for the composite particle fluid and water is selected for the suspending fluid because the thermal expansion coefficient of the Isopar™ E is much greater than the thermal expansion coefficient of water.

Second, two pigments are selected that have the applicable properties and will disperse well in their respective fluids. In this example, hydrophobically-modified titanium dioxide is selected as the white pigment and water-dispersible carbon black is selected as the black pigment and is prepared as is known in the art. The black fluid will have a much lower thermal expansion coefficient as compared to the white fluid; i.e., the density variance of the white fluid will be greater than the density variance of the black fluid over the same temperature range.

Third, choose a target reflectance for the white fluid. A higher level of reflectivity is typically desired, a reflectivity of at least 95% being preferred. Using, for example, the Kubelka Munk approximation, the volume fraction of hydrophobically-modified titanium dioxide can be estimated for a range of white fluid thicknesses using the scattering coefficient measured for this pigment. The density of the white fluid can be computed for each volume fraction of hydrophobically-modified titanium dioxide (this volume fraction being a function of the thickness of the white fluid) as a function of temperature.

Fourth, the density of the black fluid is computed as a function of the volume fraction of the black pigment within this fluid as a function of temperature.

Fifth, choose a reference temperature where the densities of the white fluid and the black fluid should be the same. Preferably, the reference temperature is approximately room temperature (72° F.).

Using the functions determined in the third and fourth steps, volume fractions of the white and black pigments meeting the requirement of equal density at the reference temperature are selected. Which volume fraction combination is selected will depend upon the overall thickness of the thermally-responsive film.

From the foregoing, it will be seen that the present invention provides for a thermally-responsive film having both solar absorbing and solar reflecting properties. A film having a continuous phase that surrounds and encapsulates a discontinuous phase wherein the discontinuous phase comprises a plurality of droplets, each of which comprises a light-absorbing suspending fluid and at least one composite particle disposed within the suspending fluid and capable of moving through the fluid in response to a change in temperature, the composite particle having a reflective component and a density component that changes the density of the particle in response to temperature.

For example, using the methodology described, a thermally-responsive film comprising two immiscible liquids, each having suspended particles (i.e., oil with mixed metal oxide and water with hydrophobically modified titanium dioxide) may have the parameters specified in Table 1.

TABLE 1

| Name | Value | Description |
|---|---|---|
| $r_{kp}$ | 3700 kg/m$^3$ | Density of black pigment (mixed metal oxide) |
| $r_{wp}$ | 4000 kg/m$^3$ | Density of white pigment (hydrophobically modified titanium dioxide) |
| $r_1$ | 1000 kg/m$^3$ | Density of fluid 1 (water) |
| $r_2$ | 700 kg/m$^3$ | Density of fluid 2 (oil) |
| $T_{ref}$ | 27 C (300K) | Reference temperature at which the fluids are density matched |
| $h_1$ | 100 mm | Thickness of black fluid layer |
| $h_2$ | 100 mm | Thickness of white fluid layer |
| $a_v^{oil}$ | 7 × 10$^{-4}$/K | Volumetric thermal expansion coefficient of oil |
| $a_v^{water}$ | 2.14 × 10$^{-4}$/K | Volumetric thermal expansion coefficient of water |
| $a_v^{white}$ | 2 × 10$^{-5}$/K | Volumetric thermal expansion coefficient of pigment (estimated) |
| $C_{pwf}$ | 2.14 kJ/Kg/K | Specific heat of white fluid (oil) |
| $C_{pkf}$ | 4.0 kJ/Kg/K | Specific heat of black fluid (water) |
| $a_k$ | 1/mm | Absorption coefficient of black pigment (mixed metal oxide) |
| $s_w$ | 10/mm | Scattering coefficient of white pigment (hydrophobically modified titanium dioxide) |
| $I_{inc}$ | 1 kW/m$^2$ | Incident solar intensity (taken comparable to peak sunlight at vertical incidence) |

It will be apparent to those skilled in the art that numerous changes and modifications can be made in the specific embodiments of the invention described above without departing from the scope of the invention. Accordingly, the whole of the foregoing description is to be interpreted in an illustrative and not in a limitative sense.

What is claimed is:

1. A thermally-responsive film comprising a continuous phase and a discontinuous phase, wherein the discontinuous phase comprises a plurality of droplets, each droplet comprising a light-absorbing suspending fluid and a vehicle containing light-reflecting particles, wherein the vehicle's density is temperature-dependent.

2. A film of claim 1, wherein the vehicle is a liquid that is immiscible with the suspending fluid.

3. A film of claim 1, wherein the vehicle is a composite particle.

4. A film of claim 3, wherein the composite particle comprises density-altering components embedded in a polymer.

5. A film of claim 4, wherein the density altering components are gas or foam.

6. A building having a least one external surface that is at least partially covered by a film of claim 1.

7. A building according to claim 6, wherein the external surface is a roof.

8. A building according to claim 6, wherein the external surface is a side wall.

9. A film of claim 1, wherein the film displays the color of the light-absorbing suspending fluid at low temperature but displays the color of the light-reflecting particles at high temperature.

10. The film of claim 1, wherein the density of the vehicle is less than the density of the light-absorbing suspending fluid at a temperature hotter than 72° F. (22° C.

11. The film of claim 10, wherein the density of the vehicle is less than the density of the light-absorbing suspending fluid at a temperature hotter than 80° F. (27° C.

12. The film of claim 1, wherein the density of the vehicle at 72° F. (22° C.) and hotter is 700 kg/m$^3$ or less.

13. The film of claim 1, wherein the absorption coefficient of the light-absorbing suspending fluid is 1/mm or greater.

* * * * *